May 19, 1931.  W. C. FERRIS ET AL  1,806,339
EXPANDING DEVICE
Filed Aug. 7, 1930
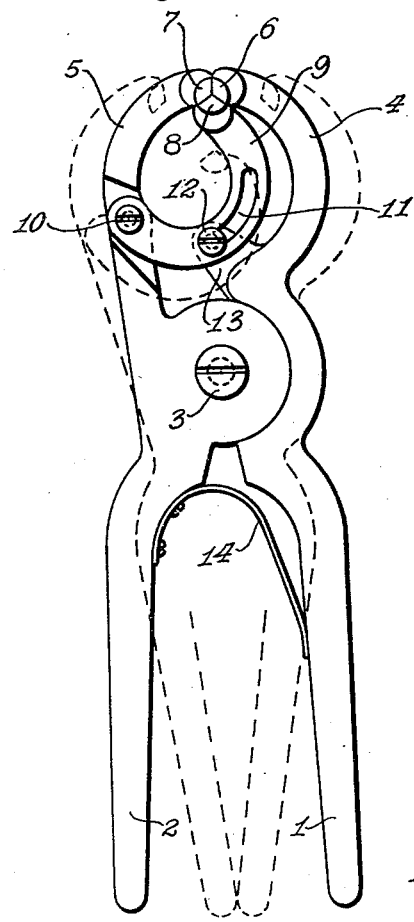
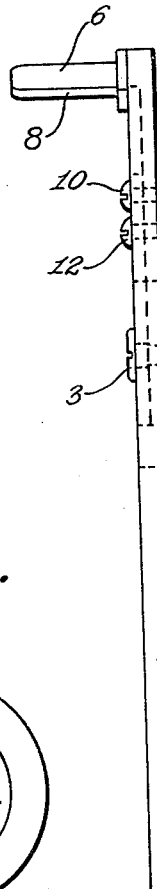
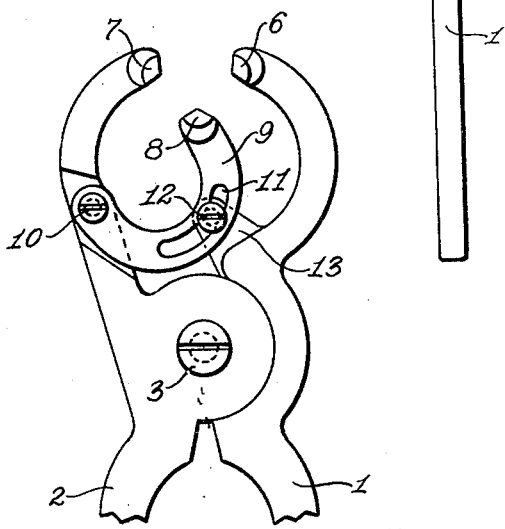
Inventors:
WHEATON C. FERRIS and ROSE M. BRENNAN,
By John N Bruninga
Their Attorney.

Patented May 19, 1931

1,806,339

UNITED STATES PATENT OFFICE

WHEATON C. FERRIS, OF UNIVERSITY CITY, AND ROSE M. BRENNAN, OF ST. LOUIS, MISSOURI

EXPANDING DEVICE

Application filed August 7, 1930. Serial No. 473,689.

This invention pertains to expanding devices, such as may be used, for instance, for expanding a rubber tube or the like to which the fitting is to be attached in order to insert the fitting.

One of the objects of this invention is to provide a device of this type in which the expanding elements may be operated so as to separate them in three directions.

Another object is to provide such a device in which the expanding elements are normally maintained in a position closely adjacent one another so as to be insertable into the article to be expanded and which may be operated so as to separate said elements in three directions.

Another object is to provide such an expanding instrument which is simple in its operation and easy to manipulate.

Further objects will appear from the following description taken in connection with the accompanying drawings, in which:—

Figure 1 is a face view of an expanding instrument embodying this invention;

Figure 2 is a side view thereof;

Figure 3 is a detail illustrating the expanding action.

Referring to the accompanying drawings the instrument illustrated comprises a pair of levers having manipulating handles 1 and 2 and pivoted together at 3. Said levers are provided with forwardly extending arms 4 and 5, respectively, which are equipped at their ends with laterally projecting expanding elements 6 and 7. A third expanding element 8 is arranged to lie closely adjacent the elements 6 and 7 at normal position as illustrated at Figures 1 and 2. The element 8 is carried by an auxiliary arm 9 pivoted at 10 to the arm 5 and having a curved slot 11 engaging a pin 12 mounted on a lug 13 on the arm 4. A spring 14 is mounted between the arms 1 and 2 so as to yieldingly maintain the levers in normal position with the expanding elements adjacent one another.

When the arms 1 and 2 are pressed together as indicated in dotted lines at Figure 1, the tips of the arms 4 and 5 are separated by the movement on the pivot 3. At the same time the pins 10 and 12 are moved away from one another which movement causes the pin 12 to slide along the slot 11 thereby swinging the arm 9 downwardly on its pivot 10. This movement carries the element 8 downwardly with respect to the elements 6 and 7. It will be seen, therefore, that the expanding elements 6, 7 and 8 are separated from one another by movements in three directions relatively to the normal position of these elements.

In using this device the arms 1 and 2 are gripped by the hand so as to form manipulating elements. With the elements 6, 7 and 8 in normal or adjacent position the same may be inserted within the article to be expanded. Thereafter the arms 1 and 2 are pressed together as indicated by dotted lines in Figure 1. This separates the elements 6, 7 and 8 which elements engage the article surrounding them to expand the same to any desired extent within the capacity of the instrument. With the article in expanded position the desired operation, such as inserting a fitting, examining the interior or the like, may be carried out, after which, by releasing the handles 1 and 2, the expanding elements are again collapsed and the article released.

This invention may be applied to practically any type of expanding device. It is not only useful as a tube stretcher, but may be applied to other expanding instruments, such as surgeons' nasal expanders and the like. While the device has been described as a unitary instrument, it will be understood that certain individual features or sub-combinations thereof, may be useful by themselves and the employment of such features or sub-combinations is contemplated by this invention and is within the scope of the appended claims.

It is further obvious that various changes may be made, within the scope of the appended claims, in the details of construction without departing from the spirit of this invention. It is, therefore, to be understood that this invention is not to be limited to the specific details shown and/or described.

Having thus described the invention what is claimed is:

1. An expanding device, comprising, a pair of movable arms, a third arm pivoted to one of said arms and movably connected with the other, expanding elements on the ends of said arms, said ends being normally adjacent, and means for moving said arms so as to separate said elements.

2. An expanding device, comprising, a pair of movable arms, a third arm pivoted to one of said arms and movably connected with the other, expanding elements on the ends of said arms, said ends being normally adjacent, means for yieldingly maintaining said arms in normal position and means for movign said arms so as to separate said elements.

3. An expanding device, comprising, a pair of pivoted arms having their ends adjacent, a member pivoted to one of said arms and slidably connected with the other, means for yieldingly maintaining said arms and said member in normal position with their free ends adjacent, expanding elements projecting laterally from the adjacent ends of said arms and said member, and means for moving said arms so as to separate said elements.

In testimony whereof we affix our signatures this 14th day of July, 1930.

WHEATON C. FERRIS.
ROSE M. BRENNAN.